(12) United States Patent
Zheng et al.

(10) Patent No.: US 9,507,731 B1
(45) Date of Patent: Nov. 29, 2016

(54) VIRTUALIZED CACHE MEMORY

(71) Applicant: Rambus Inc., Sunnyvale, CA (US)

(72) Inventors: Hongzhong Zheng, Sunnyvale, CA (US); Joseph James Tringali, Los Altos, CA (US); Vidyabhushan Mohan, Milpitas, CA (US)

(73) Assignee: Rambus Inc., Sunnyvale, CA (US)

( * ) Notice: Subject to any disclaimer, the term of this patent is extended or adjusted under 35 U.S.C. 154(b) by 232 days.

(21) Appl. No.: 14/512,254

(22) Filed: Oct. 10, 2014

Related U.S. Application Data

(60) Provisional application No. 61/889,849, filed on Oct. 11, 2013.

(51) Int. Cl.
*G06F 12/00* (2006.01)
*G06F 12/10* (2016.01)
*G06F 12/08* (2016.01)
*G06F 12/12* (2016.01)

(52) U.S. Cl.
CPC ......... *G06F 12/109* (2013.01); *G06F 12/0875* (2013.01); *G06F 12/128* (2013.01); *G06F 2212/657* (2013.01); *G06F 2212/69* (2013.01)

(58) Field of Classification Search
CPC .............. G06F 12/109; G06F 12/128; G06F 12/0875; G06F 2212/657; G06F 2212/69
See application file for complete search history.

(56) References Cited

U.S. PATENT DOCUMENTS

| | | | |
|---|---|---|---|
| 6,826,671 B2 * | 11/2004 | Ostrovsky | G06F 12/109 711/156 |
| 6,857,046 B1 * | 2/2005 | Batcher | G06F 12/0842 711/129 |
| 8,131,970 B2 | 3/2012 | Conte et al. | |
| 8,195,879 B2 | 6/2012 | Olszewski et al. | |
| 9,330,023 B2 * | 5/2016 | Bybell | G06F 12/1045 |
| 2007/0022428 A1 * | 1/2007 | Yamasaki | G06F 9/3009 718/108 |
| 2011/0296407 A1 | 12/2011 | Bhandari et al. | |
| 2012/0198172 A1 | 8/2012 | Lin et al. | |
| 2012/0297110 A1 | 11/2012 | Kavi | |

* cited by examiner

*Primary Examiner* — John A Lane
(74) *Attorney, Agent, or Firm* — Charles Shemwell

(57) ABSTRACT

A memory address and a virtual cache identifier are received in association with a request to retrieve data from a cache data array. Context information is selected based on the virtual cache identifier, the context information indicating a first region of a plurality of regions within the cache data array. A cache line address that includes a first number of bits of the memory address in accordance with a size of the first region is generated and, if the cache data array is determined to contain, in a location indicated by the cache line address, a cache line corresponding to the memory address, the cache line is retrieved from the location indicated by the cache line address.

21 Claims, 7 Drawing Sheets

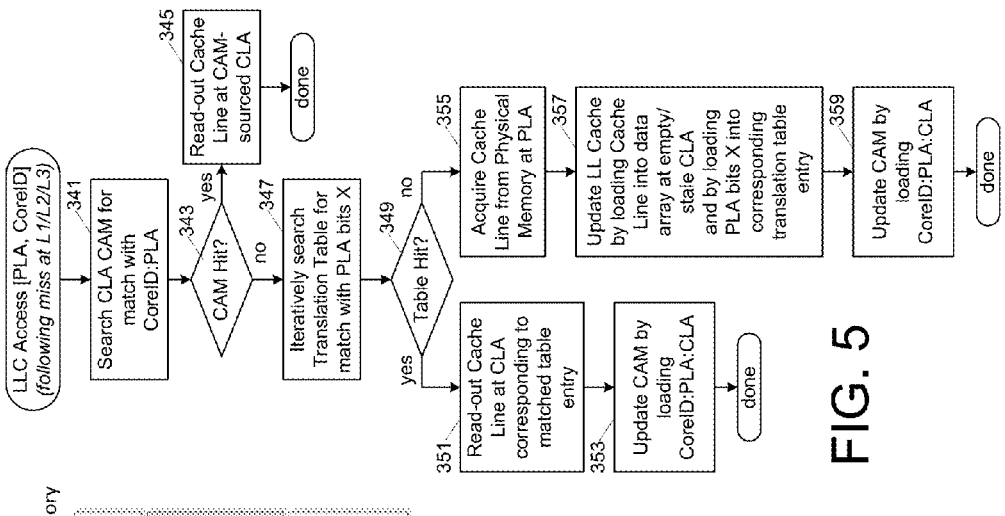
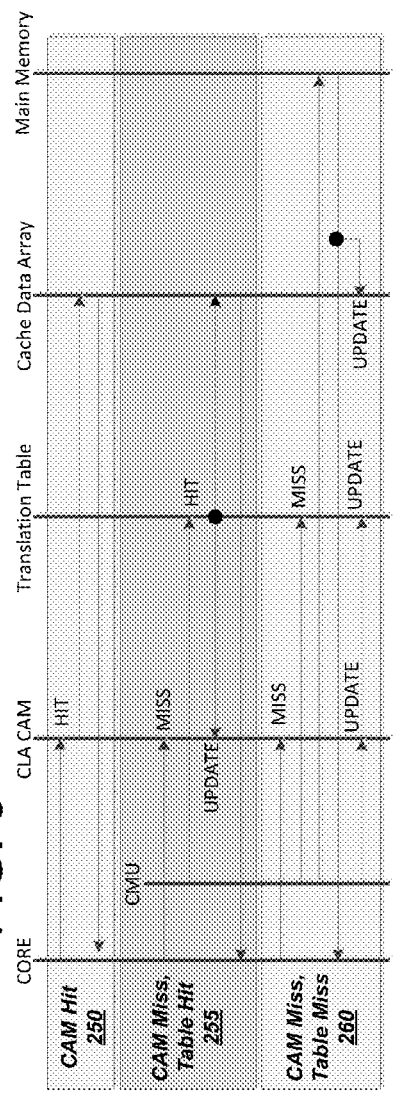
FIG. 3
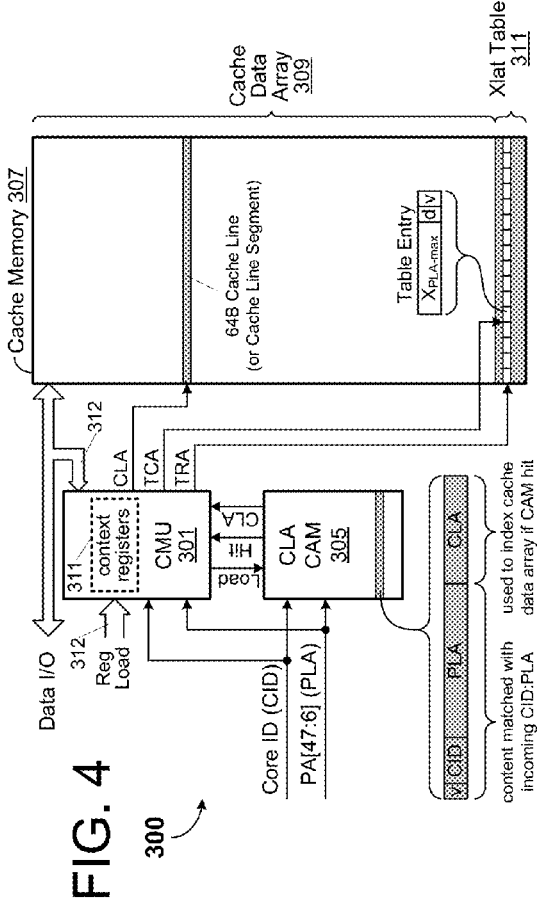
FIG. 4
FIG. 5

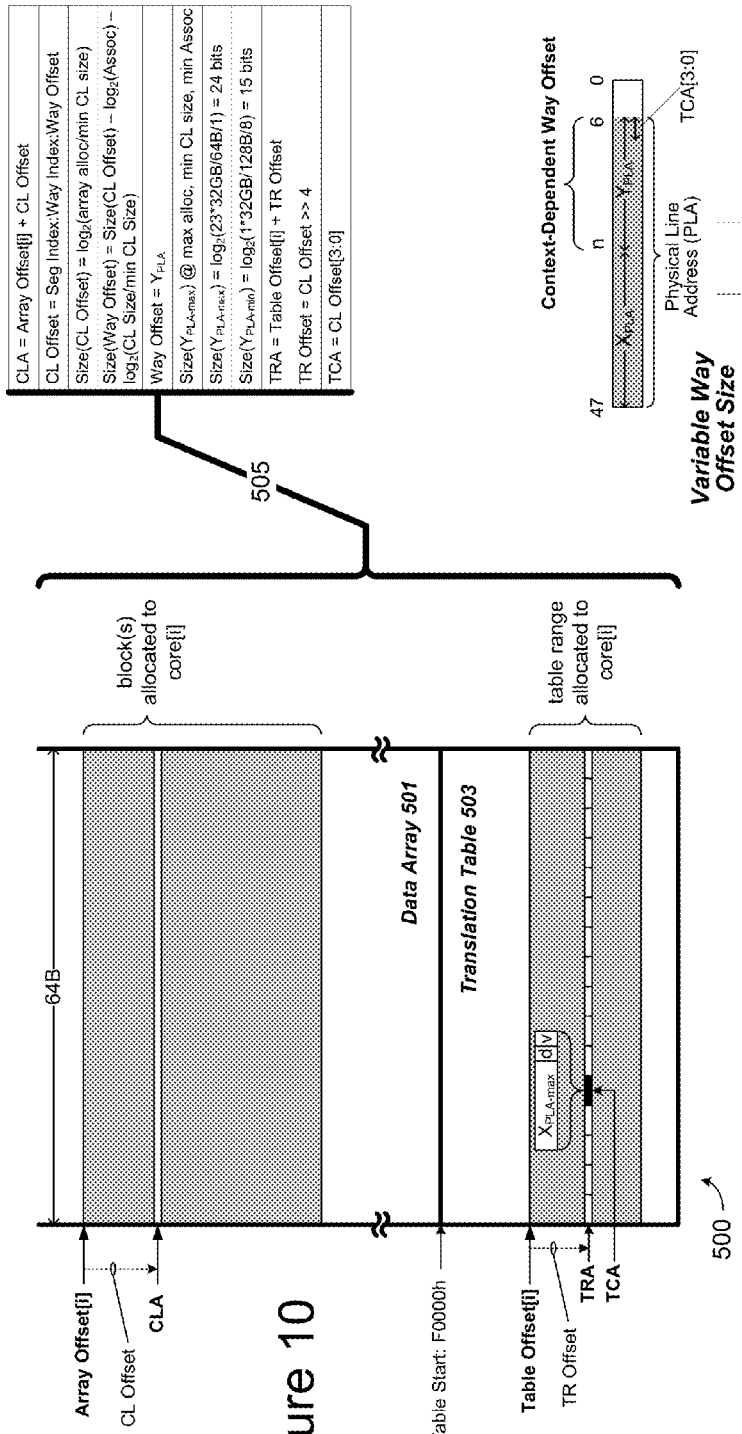
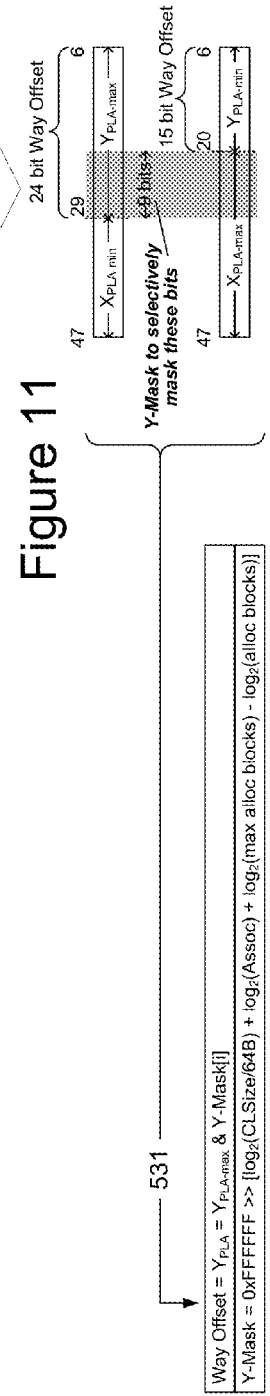
Figure 10
Figure 11

VIRTUALIZED CACHE MEMORY

TECHNICAL FIELD

The present invention relates generally to the field of data processing and more particularly to data storage and retrieval.

BACKGROUND

Runtime partitioning and allocation of processing system resources among virtual machines enables vendors to offer tailored data processing solutions to end users. For example, in a computing system having more processor cores, operating memory and mass storage than needed for a given processing application, an end-user/system designer may specify a virtual machine allocation that includes a task-appropriate subset of the processor cores and corresponding fractions of the operating memory and mass storage. The remaining cores, memory and mass storage may then be allocated to one or more other virtual machines, with all such virtual machines theoretically capable of concurrent conflict-free operation.

Unfortunately, not all resource allocations align neatly with the delineations between virtual machines. In particular, while on-board cache memories are commonly dedicated to respective processor cores and thus split between virtual machines accordingly, the significantly larger last-level cache memory is typically shared among the processor cores as a matter of practicality, and consumed on a first-come, first served basis. Consequently, despite careful allocation of computing resources to respective virtual machines, a poorly or maliciously designed program executing within one virtual machine may consume a disproportionate share of the last-level cache, depleting cache availability within other virtual machines and thus degrading their performance despite otherwise sufficient resource allocations.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an exemplary sequence of operations carried out to access and, if necessary, update a virtualized last-level cache after a higher-level cache miss for a given core;

FIG. 4 illustrates a more detailed embodiment of a virtualized last-level cache that may be used to implement the last-level cache of FIG. 2 and carry out the operational sequences presented in FIG. 3;

FIG. 5 illustrates an exemplary sequence of operations executed by the cache management unit shown in FIG. 4;

FIG. 10 illustrates the relationship between the various addresses and entries within the data array and translation table of a cache memory implemented in accordance with the exemplary design parameters described in reference to FIG. 7;

FIG. 11 illustrates the relationship between an incoming physical line address (PLA) and the context-dependent way offset in accordance with the exemplary embodiments of FIGS. 7-10;

DETAILED DESCRIPTION

A processor-shared cache memory divisible into dynamically-defined virtual partitions is disclosed in various embodiments. In one embodiment, the cache memory includes a cache data array together with a set of programmable context registers that enable programmable partitioning of the data array into virtual cache allocations. By confining access by a given processor core to a specific one of the virtual allocations, an otherwise unified cache memory space may be split among multiple processing cores (and/or among multiple virtual machines), thus avoiding cache depletion scenarios that plague prior-art partitioned processing systems. In a number of embodiments, the virtually partitionable cache memory is implemented with a tag-less architecture that employs, for example, a content-addressable-memory to enable rapid cache hit/miss determinations, and an in-cache translation table to enable relatively fast cache address lookup operations. These and other features and embodiments are discussed in greater detail below.

Figure 1:
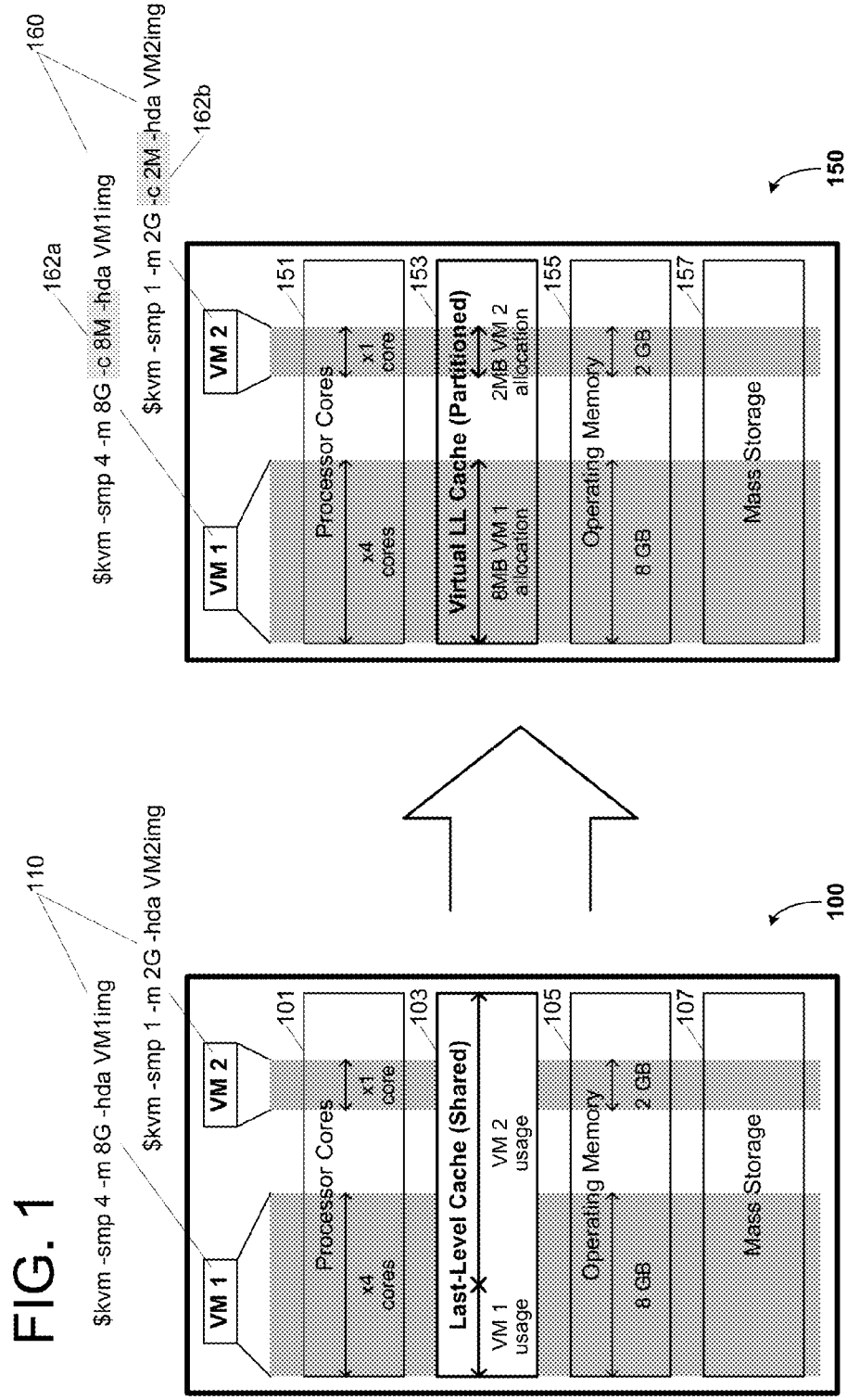
FIG. 1 contrasts multi-core computing devices and having shared and partitionable (virtualized) last-level caches.

FIG. 1 contrasts multi-core computing devices 100 and 150 having shared and partitionable (virtualized) last-level caches 103 and 153, respectively. As shown, each computing device includes multiple processing cores 101/151, operating memory 105/155 (e.g., dynamic random access memory (DRAM)), and mass storage 107/157 (e.g., solid-state or mechanical disk drives). Further, for purposes of example, command-line definitions of virtual machines VM1 and VM2 and corresponding resource allocations are shown within each computing device at 110 and 160. In the case of shared-cache computing device 100, despite allocation of substantially more processing cores, operating memory and mass storage to VM1 (i.e., a factor of 4 for each resource), unrestrained first-come-first-served access to the entirety of the last-level cache makes it possible for VM2 to disproportionately consume the last-level cache (compare VM 2 usage with VM 1 usage), bottlenecking process execution within VM1 despite its theoretically higher performance. By contrast, an additional cache-allocation parameter 162*a*/162*b* forms part of the command-line virtual machine definition within computing system 150 and enables specification of a deterministic partition of the virtual last-level cache between the two virtual machines. In the example shown, for instance, 8 MB (megabyte) of the last-level cache is allocated to VM1 (i.e., by virtue of command-line parameter "-c 8M"), while one-fourth of that is allocated to VM2 ("-c 2M"), thus aligning the cache allocation with that of other resources (although non-aligned allocations may also be specified). By this arrangement, VM1 is ensured the allocated last-level cache space regardless of execution characteristics of VM2, avoiding the cache depletion scenarios (i.e., due to malicious or poorly designed processes) that plague more conventional implementations. Note that last-level cache allocations may alternatively be specified in terms of fractions (or percentages) of the available cache storage. For example, command-line parameters "-c 0.10" or "-c 0.60" could be entered to specify 10% and 60% allocations, respectively (i.e., 1.0 corresponds to the total available cache).

Figure 2:
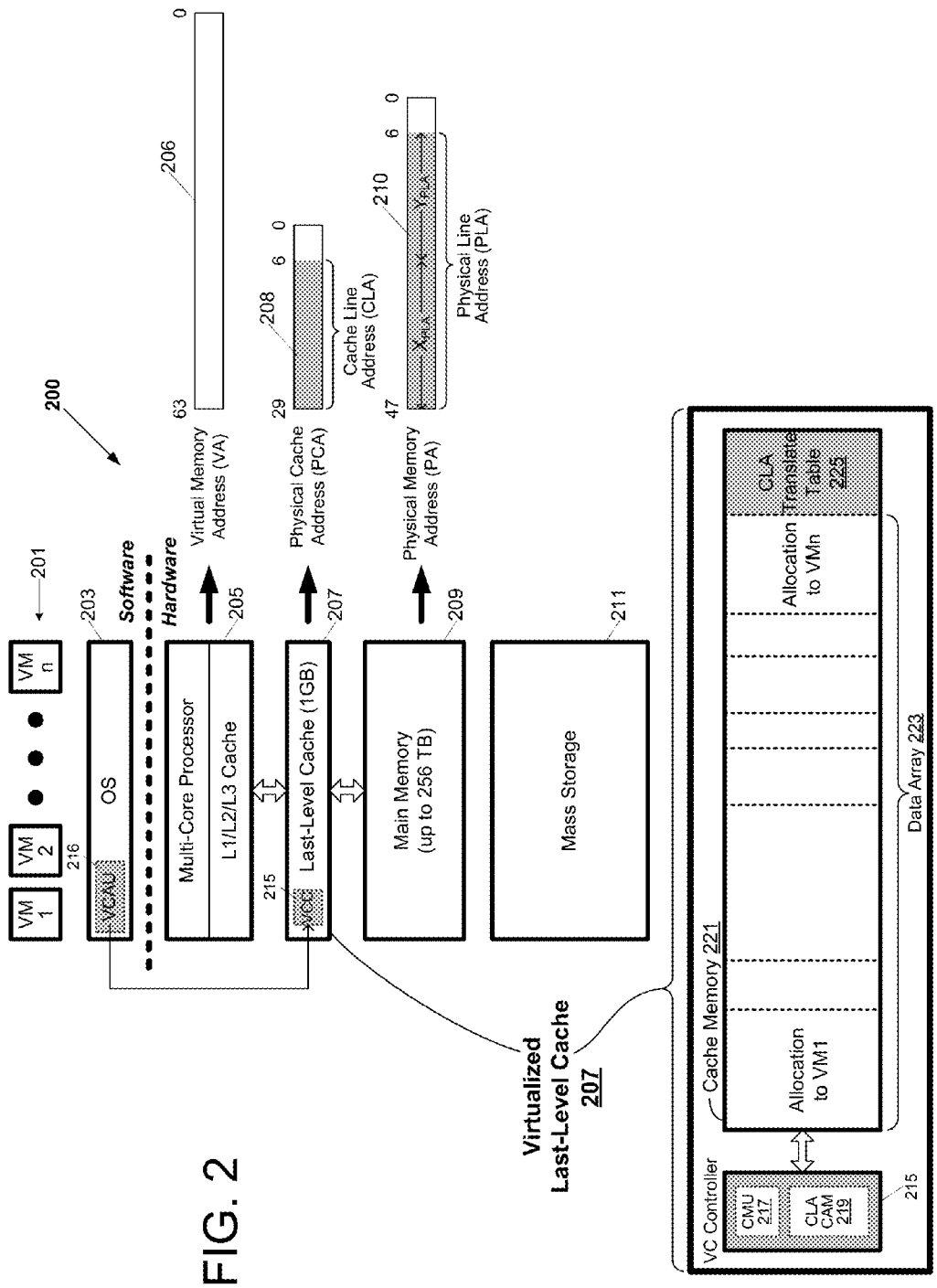
FIG. 2 illustrates a more detailed embodiment of a computing system having a virtualized last-level cache, showing a conceptual division between software and hardware components.

FIG. 2 illustrates a more detailed embodiment of a computing system having a virtualized last-level cache 207, showing a conceptual division between software and hardware components. As shown, a number (n) of virtual machines 201 are instantiated within the software division, each interfacing with a shared operating system 203 and being allocated a respective share of hardware resources, including processor cores within multi-core processor 205, last-level cache 207, main memory 209 and mass storage 211. In one embodiment, each core within multi-core processor 205 includes a dedicated (respective), hierarchically configured set of on-board cache memories (e.g., level-one, level-two and level-three caches—"L1/L2/L3 Cache") with the cache memory at each hierarchical level being accessed following a miss in the higher-level cache memory. As shown, the storage hierarchy extends beyond the on-board cache arrangement, with an on-chip cache miss yielding an access to last-level cache 207, and then to main memory 209 and/or mass storage 211 as necessary.

Continuing with FIG. 2, the memory address applied at various levels of the storage hierarchy changes, starting with a virtual address 206 (VA) within the processor, followed by a physical cache address 208 (PCA) at the last-level cache and then a physical memory address 210 (PA) within main memory. In the example shown, the 64-bit virtual address reflects the native data size operated upon by the individual processor cores, while the 30-bit physical cache address corresponds to the 1 GB (1 gigabyte) storage capacity of the last-level cache and the 48-bit physical memory address reflects the 256 TB (256 terabyte) capacity-expansion limit of the main memory. These exemplary address sizes and storage capacities are carried forward in more detailed embodiments described below, but in all cases other address sizes and/or storage capacities may apply. Also, in a number of embodiments described below, the minimum cache line size within the last-level cache and access granularity within the main memory is assumed to be 64 bytes (larger or smaller minimums may apply in alternative implementations), so that only the most significant 24 PCA bits are required to access a cache line within the last-level cache (and thus form an address referred to herein as a cache line address (CLA)), and only the most significant 42 PA bits, the "physical line address" or PLA, are required to access a 64 B data word within the main memory. As explained below, the physical line address may be conceptually split between most significant bits ($X_{PLA}$) and least-significant bits ($Y_{PLA}$) for purposes of locating entries within the last-level cache.

In the embodiment of FIG. 2, last-level cache 207 is implemented as a virtualized cache having a cache memory 221 and virtual cache controller 215 (i.e., VCC or VC Controller as shown), the latter being configured by a virtual cache allocation unit 216 (VCAU) within operating system 203 to allocate regions or partitions of cache memory 221 to respective sets of one or more processor cores and thus to respective virtual machines. In one implementation, virtual cache controller 215 includes a cache management unit 217 (CMU) and cache-line-address content-addressable memory 219 (CLA CAM) that enable coordinated access to cache memory 221. The cache memory itself is split into two logical components: a data array 223 containing cache storage regions allocated to respective virtual machines (or processor cores or groups of processor cores), and an address translation table 225 used to translate physical addresses into cache line addresses. In one embodiment, cache memory 221 is implemented by high-speed static random access memory (SRAM), though other types of memory may be used, including, without limitation, DRAM or even high-speed non-volatile memory technologies such as STT-MTRAM (spin-transfer-torque magnetoresistive RAM) and RRAM (resistive RAM—also referred to as ReRAM).

FIG. 3 illustrates an exemplary sequence of operations carried out to access and, if necessary, update a virtualized last-level cache after a higher-level cache miss for a given core. Generally speaking, each last-level cache access follows one of three transaction protocols: a CAM-hit protocol 250 executed in response to a hit in the CLA CAM; a table-hit protocol 255 executed following a CAM miss and a translation table hit; and a cache-miss protocol 260 executed following misses in both the CAM and the translation table. In the CAM-hit protocol, a core-supplied physical line address and core identifier (core ID or CID) are applied to the CLA CAM and determined to match an entry therein (i.e., a CAM "HIT" as shown). In that case, the cache line address (CLA) stored within or otherwise associated with the matching CAM entry is output from the CAM and applied to the cache data array to retrieve the cache line sought, returning the cache line to the core as shown by the arrow extending from the cache data array to the core.

The table-hit protocol starts with the same CAM search operation as the CAM-hit protocol, but instead of a CAM hit, a CAM miss ensues. Upon detecting the CAM miss, the cache management unit (CMU) within the last-level cache indexes the translation table embedded in the cache memory to determine whether the requested cache line is stored within the cache data array, despite the lack of a corresponding CAM entry. In effect, the CAM may be viewed as containing a high-speed, but incomplete mapping of cache lines (within the cache data array) to PLA addresses, whereas the translation table effects a slower, but complete mapping of cache lines to PLA addresses. In the case of a translation table hit (which could follow a sequence of accesses to the translation table depending upon the associativity setting of the virtualized cache as described below), the address of the cache line sought (i.e., the CLA) is supplied, together with the PLA and core ID in a CAM update. In one embodiment, the cache line address identified via the table hit is applied directly to the cache data array to retrieve the cache line of interest as shown by the dashed arrow extending from the translation table to cache data array (e.g., prior to or in parallel with the CAM update), with the requested cache line being returned to the core as shown.

In alternative embodiments, however, the CAM may be re-searched after the CAM update operation to obtain and apply the CLA, in effect, executing the CAM-hit protocol after the CAM has been updated to ensure a hit.

Still referring to FIG. 3, in the case of a CAM miss and table miss, the CMU executes cache miss protocol 260. More specifically, the CMU issues a memory access request to the main memory controller, thereby delegating the cache line retrieval operation to lower-tier logic within the memory hierarchy. In the embodiment shown, the retrieved cache line is stored within an empty or replacement-policy-indicated location within the cache data array in a cache data array update (and also returned to the core), and the CMU updates both the CAM and the translation table to reflect the newly loaded cache line.

FIG. 4 illustrates a more detailed embodiment of a virtualized last-level cache 300 that may be used to implement the last-level cache of FIG. 2 and carry out the operational sequences presented in FIG. 3. In the high-level view shown, virtualized cache 300 includes a cache management unit 301 (CMU), content addressable memory 305 (CAM) and cache memory 307, the latter being split between a cache data array 309 and translation table 311. For purposes of example here and below, the last-level cache is assumed to be virtually or logically partitioned among respective processor cores in accordance with context information loaded into context registers 311 (e.g., within CMU 301) via register-load port 312. As shown, an incoming cache access request includes a physical line address (PLA, which contains physical address bits 47:6 in this example) together with a core ID that identifies the access-requesting processor core, and thus which of the several virtual cache partitions is to be accessed. This core-indexed virtual cache arrangement is carried forward in a number of more detailed embodiments described below, in all such cases a virtual machine identifier, OS process identifier (PID) and/or process group identifier (GID) may be specified instead of or in addition to the core ID to enable specification of virtual-machine-indexed, process-indexed and/or process-group-indexed cache allocations with each such virtual cache being accessible by more than one processor core.

Continuing with FIG. 4 and referring also to the exemplary CMU flow diagram shown in FIG. 5, the incoming physical line address and core ID are initially compared with entries within CLA CAM 305 (i.e., in a CAM search as shown at 341), with CAM 305 asserting a hit signal ("Hit") in response to a CID:PLA match within a valid entry (i.e., 'v' bit set) and outputting the CLA stored within the matched CAM entry. The hit signal and corresponding CLA (collectively, the "CAM search result") are supplied to CMU 301 which responsively accesses cache memory 307 according to the CAM-hit or table-hit protocols described above, depending on the state of the CAM hit signal. More specifically, as shown in FIG. 5, in the case of a CAM hit (affirmative determination at 343), the CMU applies the CAM-sourced CLA to address the cache data array 309 (e.g., asserting row and column control signals and/or other access control signals as necessary), reading-out the specified cache line as shown at 345 and returning the cache line to the requesting core to complete execution of the CAM-hit protocol. In the case of a CAM miss (i.e., deasserted CAM hit signal and thus negative determination at 343), CMU 301 generates one or more translation table row and column addresses (TRA:TCA) in an iterative search (as shown at 347) for an entry within translation table 311 that matches tag bits, 'X', within the incoming physical line address. In a number of embodiments, a virtual-cache-dependent number of "way offset" bits 'Y', within the incoming physical line address are applied to retrieve a translation table entry which contains at least the remaining X bits (i.e., tag bits) of a PLA. Accordingly, if the tag bits stored at the way offset of an incoming PLA match the tag bits of the incoming PLA, then the translation table entry is deemed to match the incoming PLA and a table-hit is signaled. That is, a table-hit is detected when bits X of the incoming PLA ($X_{PLA}$) match bits X within a valid translation table entry indexed by bits Y of the incoming PLA ($Y_{PLA}$), where bits $X_{PLA}$ and $Y_{PLA}$ collectively include all bits of the incoming PLA. In the embodiment shown, validity of a selected translation table entry is determined according to the state of a "valid" bit (V) within the entry. A "dirty" bit, 'd', and/or other status bits may also be included in each table entry as discussed below. In any case, as shown at 351, following a table hit (affirmative determination at 349), a cache line is read out of cache data array 309 from a cache line address corresponding to the PLA-matching table entry and returned to the requesting core. Thereafter, CMU 301 completes the table-hit protocol by asserting a load signal ("Load") to trigger a load operation within CAM 305, loading the table-identified CLA into a CAM entry together with the PLA and core ID as shown at 353.

In the case of a translation table miss (negative determination at 349), CMU 301 executes the cache-miss protocol by instructing downstream logic (e.g., a DRAM controller) to acquire the requested cache line from physical memory as shown at 355. The CMU then updates the last-level cache at 357 by loading the retrieved cache line into data array 309 at an empty or stale location (i.e., at a CLA that corresponds to one of possibly multiple translation table entries evaluated in the iterative search at 347) and loading the tag bits of the core-supplied PLA (i.e., $X_{PLA}$) into the corresponding table entry. The CMU also updates the CAM at 359 by loading the CLA of the newly stored cache line within a CAM entry together with the core ID and incoming PLA.

In the embodiment of FIG. 4, cache memory 307 is assumed to have an access granularity that corresponds to the minimum cache line size—64 bytes (64 B) in the example shown. Thus, assuming that entries within translation table 311 are $1/N^{th}$ the size of the minimum cache line size, a read access to the translation table will return a total of N table entries, an entity referred to herein as a table row. Accordingly, the CMU carries out the iterative table search shown at operation 347 of FIG. 5 by synthesizing a sequence of table entry addresses, each of which includes (i) a table row address (TRA) that specifies the table row containing the entry of interest and (ii) a table column address (TCA) that specifies the column offset of the entry of interest within the selected table row. While both these addresses are depicted as being output by the CMU, in at least one embodiment, an entire table row is returned to CMU 301 in each table access (e.g., via shunt path 314) and then indexed internally within the CMU using the table column address (i.e., the table column address need not be output from the CMU).

To enable the iterative table searching operations described above (i.e., "table walking"), context registers 311 permit programmable definition of virtual cache allocations and parameters relating to cache operation (e.g., associativity, cache line size, replacement policy, etc.). In one embodiment, context registers 311 are loaded (programmed) in response to runtime definition of one or more virtual machines and thereafter applied to synthesize addresses and manage table-walking operations in response to incoming cache access requests. More specifically, the incoming core ID is supplied to CMU 301 to enable selection of one of multiple sets of context registers, with the selected context register set corresponding to the processor core or virtual machine requesting cache access. In the case of the table-hit and cache-miss protocols described above, addressing information within the selected context register set is applied, together with the incoming PLA (which is also supplied to the CMU) to search the translation table and access the cache data array.

Figures 6, 7:
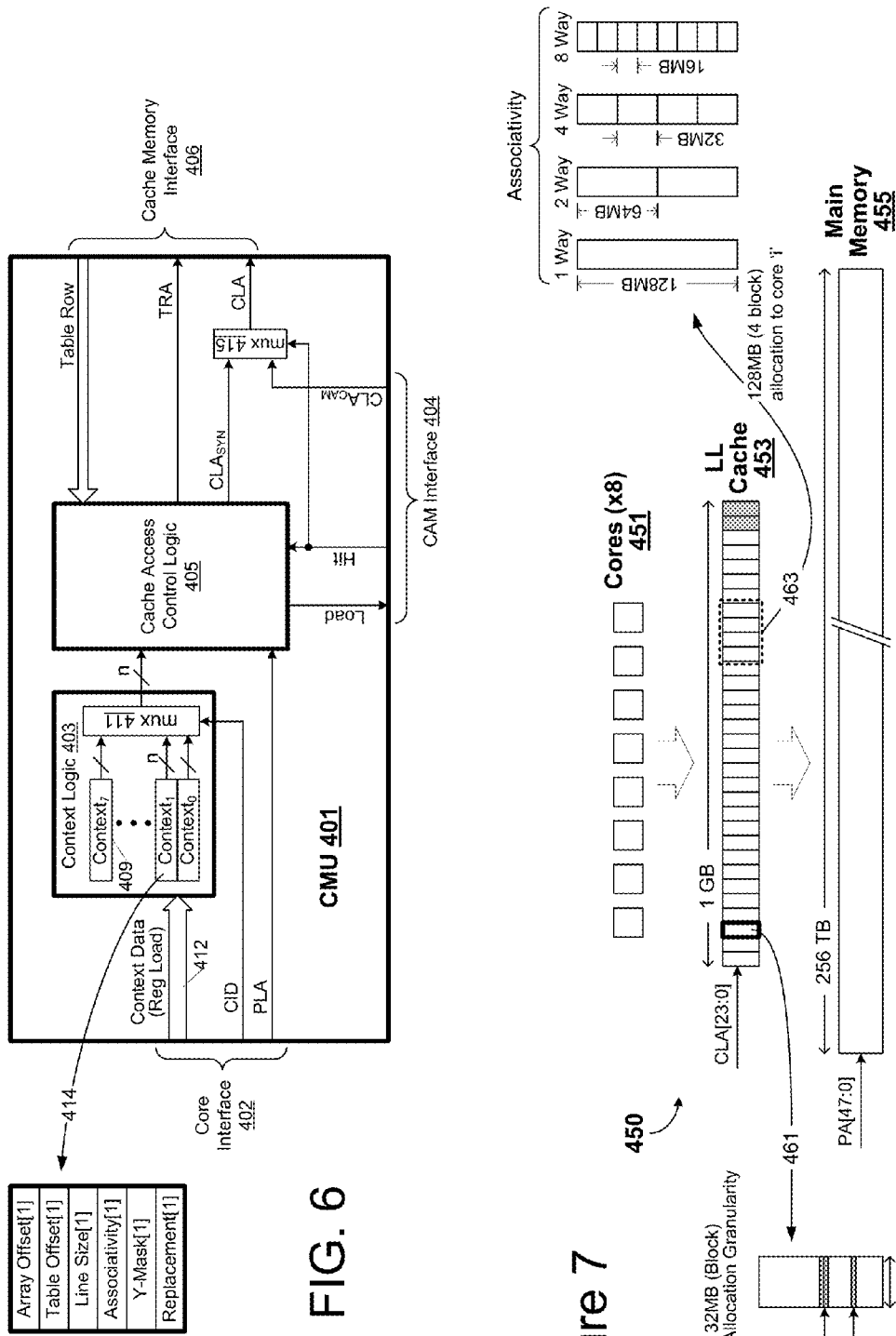
FIG. 6 illustrates a more detailed embodiment of a cache management unit containing multiple sets of programmable context registers in which each context register set corresponds to a respective processor core and/or virtual machine.
FIG. 7 illustrates an embodiment of a virtual last-level cache having an exemplary set (and selectable range) of configuration options in the context of a computing system having a specific number of processing cores and a specifically sized physical address space.

FIG. 6 illustrates a more detailed embodiment of a cache management unit 401 (CMU) containing N sets of programmable context registers 409 within context logic 403, each register set 409 corresponding to a respective one of N processor cores (and/or virtual machines, OS processes or process groups). As shown, CMU 401 also includes cache access control logic 405 (also referred to herein as an "access controller") as well as core, CAM and cache memory interfaces 402, 404 and 406, respectively. Core interface 402 includes inputs to receive a core ID value (CID) and physical line address (PLA), as well as a load port 412 to receive context data to be loaded into context registers 409 (note that load port 412 may be omitted in alternative embodiments with the CID and/or PLA input lines being multiplexed to convey register data). CAM interface 404 includes inputs to receive the CAM hit signal ("Hit") and CAM-sourced cache line address ("$CLA_{CAM}$") as discussed above, and an output to convey a CAM load signal ("Load") from access controller 405 to the CLA CAM. The cache memory interface includes an input to receive a row of translation table entries and, at least in the conceptual view shown, outputs to convey cache line address (CLA) and table row address values to the cache memory. Although the TRA and CLA may be output separately (and even concurrently) in the case of a dual-ported cache memory implementation, those address values may alternatively be multiplexed onto a shared address path to effect sequential access to the translation table and data array. Examples of the latter arrangement are described below.

In the embodiment of FIG. 6, each set of context registers 409 defines a respective virtual cache (i.e., logical allocation of a portion of the physical cache data array and translation table) and includes, for example and without limitation, bit fields and/or individual registers as shown at 414 to hold the following values:
  an array offset that indicates a starting location of a storage allocation within the cache data array (i.e., the starting address of the virtual cache);
  a table offset that indicates a starting location of a storage allocation within the embedded translation table (i.e., the starting address of the translation table entries corresponding to respective cache line locations within the virtual cache);
  the cache line size within the virtual cache;
  the associativity of the virtual cache and thus the number of ways (number of storage volumes that map to the same index bits within an incoming PLA);
  a "Y-mask" value used to mask used to generate a "way-offset" address from an incoming PLA; and
  a replacement policy setting that indicates the policy for identifying and overwriting (i.e., evicting) a "stale" cache entry (e.g., overwriting least-recently-used entry, randomly-selected entry, etc.)

A multiplexer 411 or other selector circuit is provided to select a core-ID-specified set of context registers 409 and forward the contents of selected register set to access controller 405, thereby specifying the virtual cache to be accessed in connection with an incoming physical line address (PLA).

Continuing with FIG. 6, a cache line address multiplexer 415 is provided to select between the CAM-supplied cache line address ($CLA_{CAM}$) and a cache line address synthesized within access controller 405 ($CLA_{SYN}$). More specifically, when the CAM hit signal is asserted, multiplexer 415 selects the CAM-supplied CLA to be output via cache memory interface 406, thus effecting retrieval of the CAM-indicated cache line. When the CAM hit signal is deasserted, access controller 405 generates a sequence of one or more table row addresses (TRAs) to search individual ways of the translation table in accordance with the associativity (number of ways) established by the virtual cache definition (i.e., context register settings). The table row at each successive table row address is retrieved by access controller 405 and a table entry at the table column address (TCA) within the retrieved row is evaluated for a match with the tag bits of the incoming PLA. If a table-hit is detected, access controller 405 outputs a synthesized CLA ($CLA_{SYN}$) corresponding to the hit-producing TRA:TCA value to retrieve the table-indicated cache line. As explained above, in the case of a CAM miss and table hit, access controller 405 raises the CAM load signal ("Load") to load the synthesized CLA into a vacant or policy-indicated CAM entry together with the PLA and core ID. Note that $CLA_{SYN}$ may be delivered to the CAM via the CLA path at cache memory interface 406 or via a direct output from access controller 405 to the CAM (the latter not shown in FIG. 6).

In the embodiment of FIG. 4 and a number of embodiments described below, the relative allocations of cache memory to the data array and translation table are dependent, at least in part, on the ratio of the minimum-size cache line to the maximum-size translation table entry (i.e., because there is one entry in the table for each cache line in the data array). The translation table entry size, in turn, is dependent on the maximum size of the PLA tag to be stored ($X_{PLA-max}$, among other things) and thus the minimum size of the way offset ($Y_{PLA-min}$), as the way offset and tag are to match, collectively, the size of the incoming PLA. Accordingly, the relative data array and translation table allocations may be viewed as dependent upon the minimum-size address required to fully index a virtual cache partition, and thus the minimum cache allocation to a given core in conjunction with a maximum associativity (i.e., maximum number of ways) and maximum cache line size-design parameters which may vary from implementation to implementation.

FIG. 7 illustrates an embodiment of a virtual last-level cache 453 having an exemplary set (and selectable range) of configuration options in the context of a computing system 450 having eight processing cores and a 256 terabyte physical address space (i.e., up to 256 TB main memory, and thus a 48-bit physical address). More specifically, last-level cache 453 is assumed to have a 1 gigabyte cache memory that may be partitioned and allocated to respective processor cores in 32 megabyte "blocks," with each block and thus the cache memory as a whole being accessible with 64 byte (64 B) granularity. Cache line size within a given virtual cache may be configured to 64 B or 128 B, so that either a single cache memory read or two cache memory reads are required to retrieve a cache line, and the maximum cache line index size is 24 bits (i.e., $\log_2(1 \text{ GB}/64 \text{ B})$) as indicated by CLA[23:0]. Also, each virtual cache may be configured for 1, 2, 4 or 8-way associativity so that, assuming a four block (128 MB) allocation to processor core 'i' as shown in the example at 463, each way will span 128 MB (single way), 64 MB (2 ways), 32 MB (4 ways) or 16 MB (8 ways).

Figure 8:
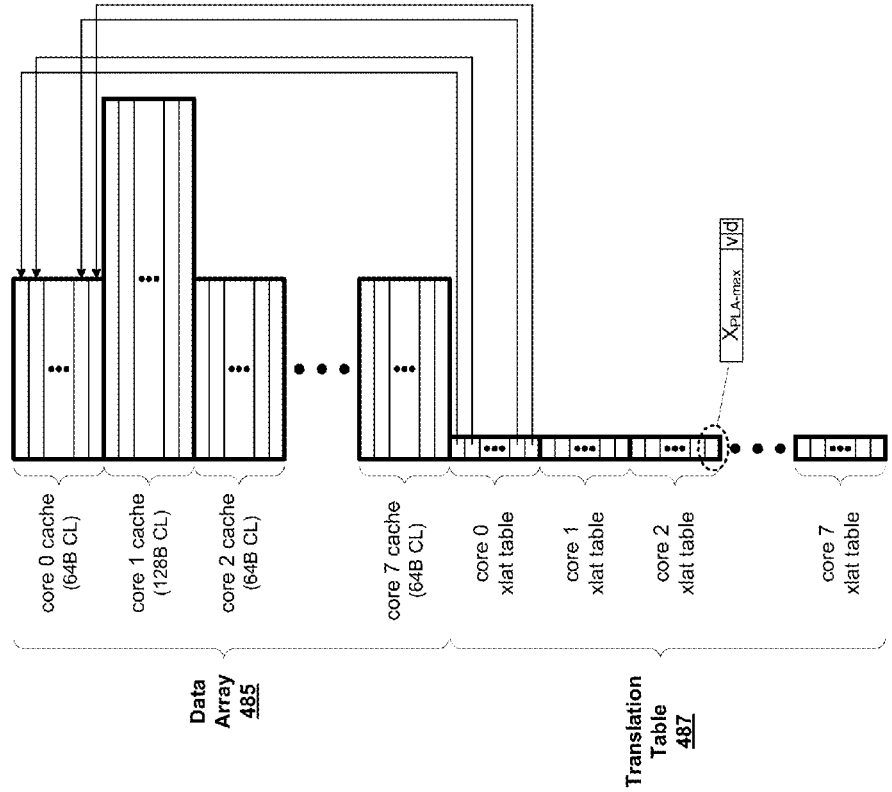
FIG. 8 illustrates an exemplary relationship between the data array and translation table that may apply within the computing-system example of FIG. 7.

FIG. 8 illustrates an exemplary relationship between the data array and translation table under the 8-core example of FIG. 7 (including optional selection between 64 B and 128 B cache line sizes). As shown, each entry within translation table 487 corresponds one-for-one to a cache line location within data array 485, so that a logical allocation of the data array to a given core (i.e., virtual cache allocation) goes hand in hand with an allocation of a corresponding portion of the translation table. In the embodiment shown, each table entry is sized to permit storage of a maximum-sized PLA tag field ($X_{PLA-max}$), together with "valid" and "dirty" status bits ('v' and 'd') which respectively indicate whether the entry contains valid data and whether the corresponding cache line has been modified since being loaded into the last-level cache. Additional bits may be stored within each table entry, for example and without limitation, to enable determination of relative ages of entries for replacement purposes (e.g., bits for determining least recently used cache entry).

While different numbers of cores, minimum cache memory allocation, main memory size, cache memory size, associativity settings, cache line sizes and so forth may apply in alternative embodiments, the exemplary configurations and selection ranges described in reference to FIGS. 7 and 8 are carried forward in a number of embodiments below for purposes of explaining design choices and operation within the virtual cache. For example, the ratio of translation table entry size to cache line size, which determines the relative division of the cache memory between data array and translation table, can be determined, in part, based on the ratio of the minimum cache line size to the maximum translation table entry size, the latter being dependent upon the minimum way offset size (i.e., as the translation table entry is to hold the PLA bits not included in the way offset). In general, the minimum way offset size occurs when a minimum data array fragment is allocated to a given core, subdivided in to the maximum number of ways and then used to store the largest possible cache lines. Thus, in the exemplary embodiment of FIG. 7, the minimum way offset size occurs when a single 32 MB block is allocated to a core (i.e., establishing a 32 MB virtual cache), split into eight ways and used to store 128 B cache lines—altogether requiring a way offset size of $\log_2(32\ MB) - \log_2(8) - \log_2(128\ B) = 15$ bits. Accordingly, to ensure a match with an incoming 42-bit physical line address, the least-significant 15 of which are used to form a way offset, a maximum of 42-15=27 bits are stored with a given translation table entry. That is, $Y_{PLA-min}=15$ and $X_{PLA-max}=27$. After accounting for status bits (e.g., valid bit, dirty bit as described below, as well as two or three bits to track entry aging for cache line eviction purposes) and aligning on a byte boundary, a four-byte (4 B) translation table entry size can be derived, and thus 16 table entries per 64 B translation table row. While other table entry sizes may apply in alternative implementations (including non-byte-aligned entry sizes), this 16:1 cache line to table entry ratio simplifies correspondence between cache line and table-entry addresses (i.e., enabling translation from one address to the other through a simple and efficient bit-shift operation) and is carried forward in embodiments described below.

Figure 9:
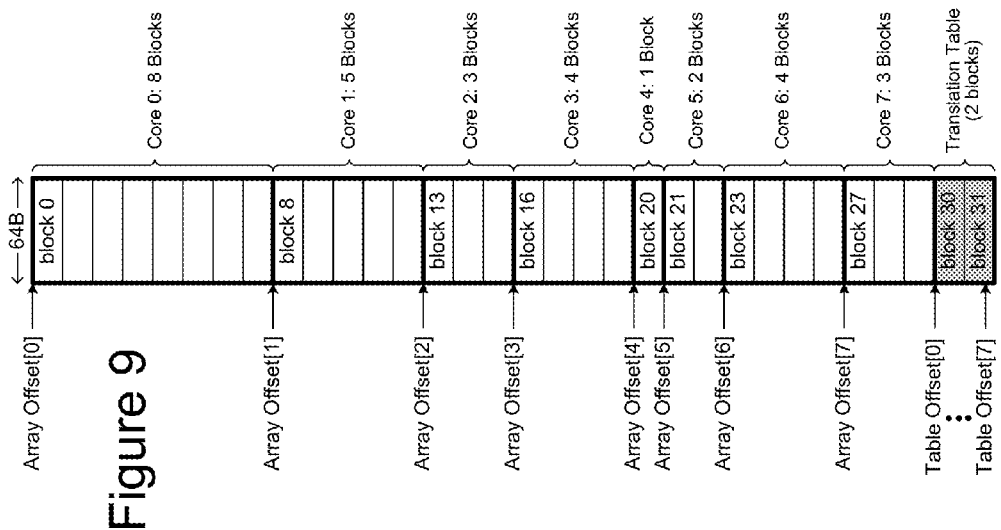
FIG. 9 illustrates application of the specific cache-line/table-entry ratio within the block-allocated last-level cache configuration of FIG. 7.

FIG. 9 illustrates application of the 16:1 cache-line/table-entry ratio within the block-allocated 1 GB last-level cache configuration of FIG. 7. As shown, the 32 available storage blocks (each block being 32 MB) are split 15:1 between the data array (30 blocks) and translation table (shaded 2 blocks), thus slightly over-allocating the translation table in return for a block-aligned boundary between data array and translation table. Following the exemplary design parameters described in reference to FIG. 7, a minimum of one 32 MB block is reserved for each processor core, so that a maximum allocation to any single core is 23 blocks (i.e., reserving seven blocks for the remaining seven cores). Together with minimum cache line size and associativity selections (i.e., 64 B cache line, single way), this maximum allocation yields the maximum number of cache lines per way and thus the maximum way-offset size, $Y_{PLA-max}$. As explained in greater detail below, the maximum and minimum way offset sizes define the range of variably-sized way offsets that may apply for a given core allocation and thus a design criterion for circuitry to synthesize translation table and cache line addresses.

An exemplary set of core allocations are depicted in FIG. 9, with eight 32 MB blocks allocated to core 0, five blocks allocated to core 1, three blocks to core 2 and so forth. In one embodiment the allocations to a given set of cores 0 through i-1 core are used to determine the array offset (i.e., starting point of data array allocation) for the $i^{th}$ core. That is, the array offset for core i (Array Offset[i]) is given by the sum of the allocations to cores 0 through i-1 divided by the access granularity of the data array so that the array offset for core 0 is 0x000000 (i.e., starting address of block 0, where the '0x' prefix denotes hexadecimal notation), the array offset for core 1 is 0x400000 (starting address of block 8), the array offset for core 2 is 0x610000 (starting address of block 13), the array offset for core 3 is 0x800000 (starting address of block 16), and so forth. Each of these array offsets may be loaded into a context register for the corresponding core (e.g., as shown in FIG. 6) and supplied to a cache access controller to enable rapid address synthesis during table walking operations.

In one embodiment, the translation table allocation is a 1:16 scaling of the data array allocation, regardless of the cache line size within a given partition, so that the offset of the table allocation relative to the table starting address for each virtual cache is $\frac{1}{16}^{th}$ that of the array offset. That is, the two block translation table is partitioned and allocated to virtual caches in the same proportion as the partitioning and allocation of the 30-block data array. Despite this deterministic relationship, separate table and array offset values may nevertheless be provided in connection with virtual cache definition (e.g., provided for in context registers 409 as shown in FIG. 6) in view of the table offset address arithmetic implicated by the 15:1 (instead of 16:1) block allocation ratio between data array and table. That is, assuming that the table starting address corresponds to the start of block 30, then the table offset for core 0 is 0xF00000 (the table starting address, the table offset for core 1 is 0xF40000 (the table starting address plus the core 0 allocation divided by 16), the table offset fore core 2 is 0xF61000, the table offset for core 3 is 0xF80000 and so forth. In alternative embodiments, particularly where the table offset may be efficiently derived from the array offset (or vice-versa), a single offset value or even a core allocation value may be stored within virtual cache context registers instead of the separate core and table offset values shown in FIG. 6 and described below.

In one embodiment, the scaled table allocation is independent of the cache line size within the corresponding core allocation. Consequently, when the 128 B (2×) cache line size is selected for a given virtual cache (halving the number of cache lines to be stored and thus halving the required number of translation table entries), half of the translation table allocation for that virtual cache is unused. In alternative embodiments, the table allocation may be adjusted according to the cache line size in return for slightly more complex conversion between cache line and table addresses. Also, each 2× (128 B) cache line is stored as a pair of 64 B cache line "segments" in a number of embodiments, with the different segments being selected by a segment index that forms the most significant bit of the cache line offset. Under such an arrangement, the data array allocation and way organization for the high-order and low-order line segments appear as separate contiguous instances of the allocation and organization that would apply in the case of a 64 B cache line size. In alternative embodiments, the high and low order line segments may appear in adjacent way allocations (i.e., line segment index applied as a higher-order bit than way offset, but lower order bit than way index), or in adjacent storage locations (i.e., line segment bit applied as lowest order bit in way index). In all such cases, the data array allocation and way organization may be extended to accommodate more than two cache line sizes and/or cache line sizes other than 64 B and 128 B.

FIG. 10 illustrates the relationship between the various addresses and entries within the data array 501 and translation table 503 of a cache memory 500 implemented in accordance with the exemplary design parameters described in reference to FIG. 7. As shown in the diagram of cache memory 500 and address arithmetic at 505, each cache line is indexed by a cache line address (CLA) that corresponds to a sum of the array offset for a given core (Array Offset[i]) and a cache line offset ("CL Offset"), the latter formed by a combination of a line segment index (i.e., "Seg Index" indicating which of multiple cache line segments is being accessed, if cache line size is greater than 64 B), way index (i.e., a value indicating one of N ways, depending on the associativity setting) and way offset. In the depicted implementation, the size (number of constituent bits) of the cache line offset is $\log_2$(array allocation divided by minimum cache line size), and the size of the way offset (which corresponds to index bits $Y_{PLA}$ within the incoming physical line address) is the size of the cache line offset less (i) the number of bits required to form the way index ($\log_2$(associativity)), and (ii) the number of bits required to form the segment index ($\log_2$(cache line size/minimum cache line size)). Accordingly, the maximum way offset size (size of $Y_{PLA-max}$) occurs when the core allocation is maximized, and the cache line size and associativity are minimized, and, conversely, the minimum way offset size (size of $Y_{PLA-min}$) occurs when the core allocation is minimized and the cache line size and associativity are maximized. More specifically, under the exemplary parameters of FIG. 7, a maximum 24-bit way offset size occurs when 23 blocks are allocated to a given core and used to store 64 B cache lines in a single way (i.e., requiring 5 block select bits to enable selection of any one of 23 blocks, and 19 bits to index one of 32 MB/64 B=$2^{19}$ cache line locations within a selected block. By contrast, a minimum 15-bit way offset size occurs when a single block is allocated to a given core and used to store 128 B cache lines in eight different ways (i.e., requiring zero block-select bits and 15 bits to index one of 32 MB/128 B/8=$2^{15}$ cache line locations within a given way.

Still referring to the embodiment of FIG. 10, the table row address (TRA) is obtained by summing the table offset for the core (Table Offset[i]) and a "table row offset" (TR Offset), with the latter being a shift-right-by-4 version of the cache line offset (i.e., "CL Offset>>4") and reflecting the row offset between first row of the table allocation to core 'i' and the row containing the entry of interest. The table column address (TCA) may be obtained from the least-significant four bits of the column offset ("CL Offset[3:0]) as shown.

FIG. 11 illustrates the relationship between an incoming physical line address (PLA) and the context-dependent way offset in accordance with the exemplary embodiments of FIGS. 7-10. As explained above (and shown in FIG. 10), some number of the least-significant bits (Y) of the of the incoming PLA (i.e., $Y_{PLA}$) are applied as the way offset for purposes of cache line and table address synthesis, with the exact number of bits being context dependent (i.e., depending on the virtual cache definition for a given core, virtual machine, OS process and/or process group). More specifically, assuming the virtual cache definition parameters shown in FIG. 7, the size of the way offset may range from 24 bits (maximum core allocation, single way, minimum cache line size) to 15 bits (minimum core allocation, maximum way and cache line size) so that a variable number of bits are to be selected from the incoming PLA for cache line and table address synthesis in accordance with the definition of the virtual cache to be accessed (i.e., some number of bits between PLA[29:6] and PLA[20:6] as shown for the maximum and minimum way offset configurations). In one embodiment, this context-dependent way offset is generated by selecting bits from an incoming PLA according to the maximum-sized way offset (i.e., $Y_{PLA-max}$=PLA[29:6] in the example shown) and then masking out high order bits of the maximum-sized way offset in accordance with the virtual cache definition. More specifically, as shown at 531, the Y-mask field described above (Y-Mask[i]) indicates the number of high-order way offset bits to be masked for a given virtual cache definition and thus may be logically ANDed with bits $Y_{PLA-max}$ of an incoming physical line address to yield the desired way offset. As shown, in one embodiment, the Y-mask field is implemented by right shifting a 24-bit string of '1' bits in accordance with the cache line size (right-shifting a '0' into the Y-mask value and evicting a '1' for each doubling of the cache line size relative to the minimum), the associativity (right-shifting a '0' into the Y-mask value for each doubling of the associativity relative to the minimum), and the number of blocks allocated to the virtual cache (right shifting a number of '0's into the Y-mask value according to the difference between the number of block select bits required for a maximum allocation (e.g., 5) and the number of block select bits required for the actual allocation (e.g., 0 to 5)). In effect, masking $Y_{PLA-max}$ with Y-mask clears the most significant bits from $Y_{PLA-max}$ as necessary to enable those bit positions to be used for way index and cache line segment index bits as well as to reflect the size of the way being indexed.

Figure 12:
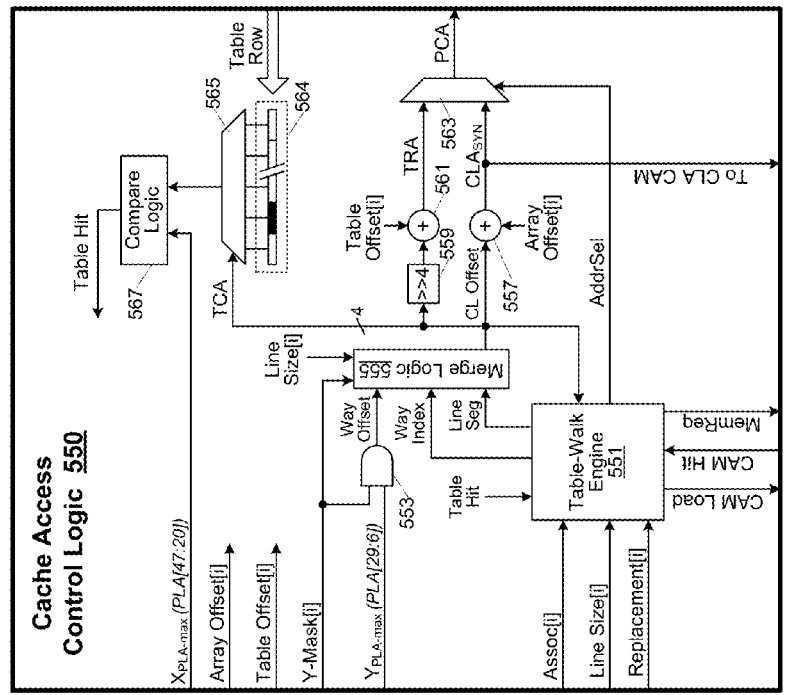
FIG. 12 illustrates an embodiment of a cache access control logic circuit implemented in accordance with the exemplary cache design parameters described in reference to FIG. 7-11.

FIG. 12 illustrates an embodiment of a cache access control logic circuit 550 or "access controller" implemented in accordance with the exemplary cache design parameters described in reference to FIG. 7-11. As shown, access controller 550 receives core-specific context register settings (e.g., array offset, table offset, Y-mask, associativity, line size and replacement values) together with a physical line address (PLA) associated with a cache access request (the "incoming PLA"). In one embodiment, the incoming PLA is split between separately-routed and overlapping bit fields that correspond to (i) a maximum-sized tag field, $X_{PLA-max}$ (PLA[47:20]), and (ii) a maximum-sized way offset field, $Y_{PLA-max}$ (PLA[29:6]). The way offset bit field is masked with Y-mask[i] within AND circuitry 553 (i.e., executing a logic ANDing operation) to yield a finalized way offset sized in accordance with the core-specific virtual cache allocation. Though not specifically shown, the Y-mask value and corresponding AND logic circuitry may be sized to operate on the specific bits of the maximum-sized way offset field that may need to be masked (e.g., the most-significant 9 bits of $Y_{PLA\text{-}max}$ in the implementation of FIG. 12).

As shown, the incoming associativity value (Assoc[i]) is supplied to a table-walk engine 551 which generates an ascending (or descending) way index count as successive ways of the virtual cache allocation are searched for a table hit. The way index and way offset are merged (i.e., inserted into adjacent bit fields), together with a segment index from table-walk engine 551, within merging logic 555 to yield a cache line offset (CL Offset). In one embodiment, for example, merging logic 555 determines the size and bit positions of the way index within the final cache line offset based on the number of bits masked (indicated by the Y-field) and the cache line size for the virtual cache being accessed, in effect, ORing the way index into the appropriate masked region of the maximum-sized way offset bit field. In one embodiment the segment index (i.e., bit field used to select successive segments of a multi-segment cache line) is merged into the most significant bit positions within the cache line offset, but other bit positions could be used.

Still referring to FIG. 12, the cache line offset is summed with the core-specific array offset within adder 557 to yield a synthesized cache line address ($CLA_{SYN}$), and is shifted right by four bits within shifter 559 (note that shifter 559 may be implemented by wire routing instead of requiring active circuitry) and summed with the table offset within adder 561 to yield a table row address (TRA). The least significant four bits of the cache line offset form a table column address (TCA) as shown. The cache line offset is also supplied to table-walk engine 551 to enable logging of cache line offsets corresponding to empty table entries and thus locations into which a new cache line may be loaded in the case of a table miss.

The synthesized cache line address and table row address are supplied to multiplexer 563 which selects one of those two addresses to be output as a physical cache address (PCA) according to an address select signal (AddrSel) from table-walk engine 551. More specifically, table-walk engine 551 (e.g., implemented by a finite state machine) responds to a CAM miss indication (e.g., low state of "CAM Hit" signal) by selecting the table row address (TRA) to be output as the physical cache address and thus retrieving a row of translation table entries 564. The table column address (TCA) is applied to the select input of multiplexer 565 to select the desired table entry from the retrieved row (i.e., the table entry corresponding to the synthesized column address, $CLA_{SYN}$), with the selected table entry passed to compare logic 567 for comparison with the tag bits of the incoming physical line address. In one embodiment, compare logic 567 asserts a table hit signal ("Table Hit") if the selected table entry is indicated to be valid (e.g., 'v' bit is high) and the PLA tag bits within the table entry match the incoming PLA tag bits. Conversely, if the selected table entry is invalid (i.e., empty as indicated by a logic low 'v' bit) or the tabulated and incoming PLA tag bits do not match, the table-hit signal is deasserted.

Continuing with FIG. 12, the table hit signal is supplied to table-walk engine 551 and, if asserted following a translation table access, triggers a cache line retrieval operation. More specifically, table-walk engine 551 outputs the address-select signal in a state that selects the synthesized cache line address ($CLA_{SYN}$) as the physical cache address and issues control signals (not specifically shown) to carry out a cache memory read. Table-walk engine 551 also asserts a CAM load signal ("CAM Load") to enable the incoming PLA and core ID to be loaded into a CAM entry together with the synthesized CLA address from which the cache line was retrieved.

If the table-hit signal is deasserted following a translation table access, table-walk engine 551 increments the way index and, if the way index has not exceeded the number of ways indicated by the incoming associativity value, enables a new table search (i.e., table row retrieval and table entry comparison) using the updated way index, thus walking through the ways of the virtual cache. If the way index is determined to exceed the ceiling set by the associativity value, table-walk engine 551 signals a table miss by outputting a memory access request signal ("MemReq") to downstream memory control logic.

Still referring to FIG. 12, when retrieving an above-minimum-size cache line, table-walk engine 551 initiates a sequence of cache memory accesses to retrieve respective cache line segments, incrementing the line segment index (LineSeg) after each segment retrieval operation. The line segment index may be cleared (or otherwise restored to an initial value) in the cache line address supplied in the CLA CAM update operation, thus pointing the CAM entry to the starting segment for the cache line. Though not specifically shown, access controller 550 may also include logic to support multi-segment cache line retrieval following a CAM hit.

Figure 13:
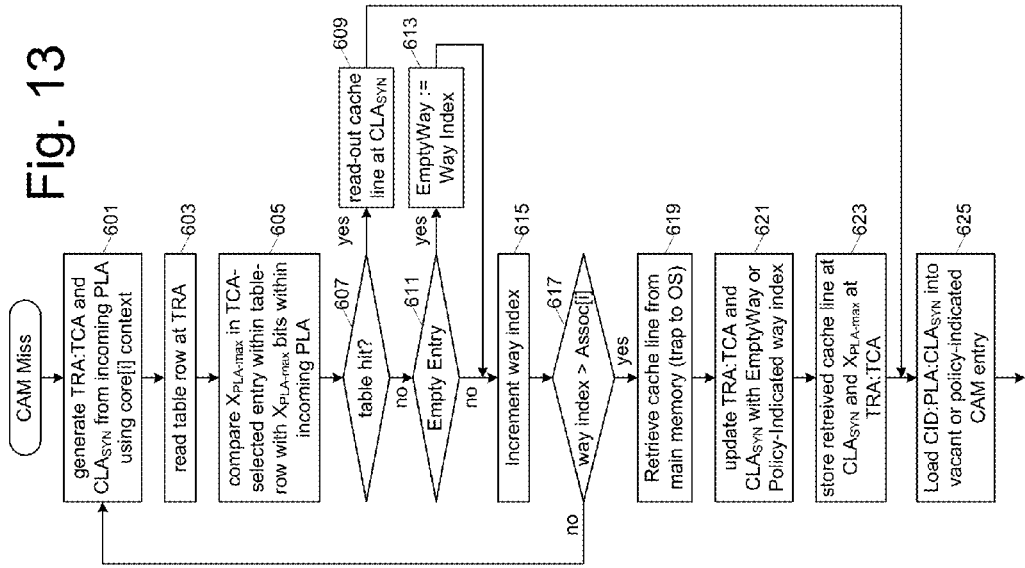
FIG. 13 illustrates an exemplary sequence of operations within the cache access control logic circuit of FIG. 12 following a CAM miss.

FIG. 13 illustrates an exemplary sequence of operations within the access controller of FIG. 12 following a CAM miss. Starting at 601, the access controller synthesizes a cache line address ($CLA_{SYN}$) and corresponding translation table address (TRA:TCA) from the incoming physical line address (PLA) and context register settings for the specified core (i.e., "core[i] context"). At 603, the access controller acquires the row of table entries at the table row address and then at 605 compares the tag value ($X_{PLA\text{-}max}$) within a table-column-address-selected entry with corresponding tag bits within the incoming PLA. If the tabulated and incoming PLA tags match (i.e., a table hit and thus affirmative determination at 607), the cache line at the $CLA_{SYN}$ is read-out and returned to the requesting core at 609, and a CAM update is performed at 625 (i.e., loading the incoming core ID and PLA into a CAM entry together with the synthesized cache line address).

If the tag-bit comparison at 605 yields a table miss (i.e., negative determination at 607), then the valid bit for the translation table entry is evaluated at 611 to determine whether the corresponding cache line location is empty. That is, if the 'v' bit within the translation table entry is in a not-valid state, then the corresponding cache line location is deemed to be empty and available for storage of a cache line upon eventual determination that none of the ways of the cache contains the cache line sought. Accordingly, if the cache line location is determined to be empty, an "empty way" storage element is loaded with the current way index, thus noting that index as being available for cache line storage in the event a cache miss occurs.

Continuing with FIG. 13, after detecting a table miss and selectively logging the way index (i.e., logging the way index at 613 if the cache line location is determined to be empty), the way index is incremented at 615 to enable a table hit/miss determination with respect to a subsequent way of the virtual cache. If the way index does not exceed the associativity setting for the access-requesting core (i.e., negative determination at 617), the table search operations described above are repeated. If the way index is determined to exceed the associativity setting at 617, then a translation table miss has been detected in each virtual cache way and thus a cache miss has occurred. In that case, the access controller issues a request to downstream memory control logic (e.g., by signaling a trap to the operating system) to retrieve a cache line from main memory as shown at 619. At 621, the access controller updates the table address (TRA: TCA) and cache line address ($CLA_{SYN}$) to include either the way index within the empty way register (i.e., recorded at 613) or, if no empty way index was detected, a way index indicated by the replacement policy (e.g., least-recently-used or random replacement policies). The updated cache line address and table address are output one after another at 623 to enable storage of the retrieved cache line within the cache data array and PLA tag field within the translation table. Lastly, the CLA CAM is updated at 625 by loading an entry containing the updated cache line address ($CLA_{SYN}$) together with the incoming PLA and core ID.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" may include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied in combination with any other of the embodiments or in place of counterpart features or aspects thereof. Accordingly, the specification and drawings are to be regarded in an illustrative rather than a restrictive sense.

What is claimed is:

1. A method of operation within a data cache, the method comprising:
   receiving a memory address and a virtual cache identifier in association with a request to retrieve data from a data array of the data cache;
   selecting, based on the virtual cache identifier, context information that indicates a first region of a plurality of regions within the data array;
   generating a cache line address that includes a first number of bits of the memory address in accordance with a size of the first region;
   determining if the data array contains, in a location indicated by the cache line address, a cache line corresponding to the memory address; and
   retrieving the cache line from the data array location indicated by the cache line address if the cache line corresponds to the memory address.

2. The method of claim 1 wherein the data array is sized to store at most N cache lines, and wherein receiving the memory address comprises receiving M memory address bits, M being greater than $\log_2(N)$.

3. The method of claim 1 wherein the virtual cache identifier corresponds to at least one of (i) one or more processor cores within a multi-processor-core computing device or (ii) a virtual machine instantiated within a computing device.

4. The method of claim 1 wherein selecting context information based on the virtual cache identifier comprises selecting cache line size information that indicates a number of constituent bits within each cache line stored within the first region the data array.

5. The method of claim 1 wherein selecting context information based on the virtual cache identifier comprises selecting associativity information that indicates a number of associated sub-regions within the first region the data array.

6. The method of claim 5 wherein generating the cache line address that includes the number of bits of the memory address in accordance with a size of the first region comprises including within the cache line address the first number of bits of the memory address in accordance with both the size of the first region and the number of associated sub-regions within the first region.

7. The method of claim 1 wherein selecting context information based on the virtual cache identifier comprises selecting cache-line replacement information that indicates a cache-line replacement policy to be applied within the first region of the data array.

8. The method of claim 1 wherein determining if the data array contains the cache line corresponding to the memory address comprises retrieving an entry from a location within a translation table of the data cache and comparing contents of the entry with a bit field of the memory address that includes bits other than bits included in the cache line address.

9. The method of claim 8 wherein retrieving an entry from the location within the translation table comprises generating a translation table address that includes the first number of bits of the memory address.

10. The method of claim 8 wherein retrieving the cache line from the data array location indicated by the cache line address if the cache line corresponds to the memory address comprises retrieving the cache line from the data array location indicated by the cache line address if the contents of the entry retrieved from the translation table are indicated to be valid and determined to match the bit field of the memory address.

11. A data cache comprising:
a cache memory; and
cache management circuitry to:
receive a memory address and a virtual cache identifier in association with a request to retrieve data from a data array within the cache memory;
select, based on the virtual cache identifier, context information that indicates a first region of a plurality of regions within the data array;
generate a cache line address that includes a first number of bits of the memory address in accordance with a size of the first region;
determine if the data array contains, in a location indicated by the cache line address, a cache line corresponding to the memory address; and
retrieve the cache line from the data array location indicated by the cache line address if the cache line corresponds to the memory address.

12. The data cache of claim 11 wherein the data array is sized to store at most N cache lines, and wherein the memory address comprises M memory address bits, M being greater than $\log_2(N)$.

13. The data cache of claim 11 wherein the virtual cache identifier corresponds to at least one of (i) one or more processor cores within a multi-processor-core computing device or (ii) a virtual machine instantiated within a computing device.

14. The data cache of claim 11 wherein the cache management circuitry to select context information based on the virtual cache identifier comprises circuitry to select cache line size information that indicates a number of constituent bits within each cache line stored within the first region the data array.

15. The data cache of claim 11 wherein the cache management circuitry to select context information based on the virtual cache identifier comprises circuitry to select associativity information that indicates a number of associated sub-regions within the first region the data array.

16. The data cache of claim 15 wherein the cache management circuitry to generate the cache line address that includes the number of bits of the memory address in accordance with a size of the first region comprises circuitry to include within the cache line address the first number of bits of the memory address in accordance with both the size of the first region and the number of associated sub-regions within the first region.

17. The data cache of claim 11 wherein the cache management circuitry to select context information based on the virtual cache identifier comprises circuitry to select cache-line replacement information that indicates a cache-line replacement policy to be applied within the first region of the data array.

18. The data cache of claim 11 wherein the cache management circuitry to determine if the data array contains the cache line corresponding to the memory address comprises circuitry to retrieve an entry from a location within a translation table of the data cache and comparing contents of the entry with a bit field of the memory address that includes bits other than bits included in the cache line address.

19. The data cache of claim 18 wherein the circuitry to retrieve an entry from the location within the translation table comprises circuitry to generate a translation table address that includes the first number of bits of the memory address.

20. The data cache of claim 18 wherein the circuitry to retrieve the cache line from the data array location indicated by the cache line address if the cache line corresponds to the memory address comprises circuitry to retrieve the cache line from the data array location indicated by the cache line address if the contents of the entry retrieved from the translation table are indicated to be valid and determined to match the bit field of the memory address.

21. A data cache comprising:
a data array;
means for receiving a memory address and a virtual cache identifier in association with a request to retrieve data from the data array;
means for selecting, based on the virtual cache identifier, context information that indicates a first region of a plurality of regions within the data array;
means for generating a cache line address that includes a first number of bits of the memory address in accordance with a size of the first region;
means for determining if the data array contains, in a location indicated by the cache line address, a cache line corresponding to the memory address; and
means for retrieving the cache line from the data array location indicated by the cache line address if the cache line corresponds to the memory address.

* * * * *